United States Patent [19]

Bertling et al.

[11] Patent Number: 5,521,798
[45] Date of Patent: May 28, 1996

[54] HEADLAMP FOR VEHICLES WITH REFLECTOR EDGE COVER

[75] Inventors: Johannes Bertling, Vaihingen; Hans Daumueller, Bodelshausen; Gerd Bahnmueller, Holzgerlingen, all of Germany

[73] Assignee: Robert Bosch GmbH, Stuttgart, Germany

[21] Appl. No.: 506,398

[22] Filed: Jul. 24, 1995

[30] Foreign Application Priority Data

Sep. 28, 1994 [DE] Germany ............ 44 34 667.0

[51] Int. Cl.$^6$ ............ B60Q 1/064; B60Q 1/076
[52] U.S. Cl. ............ 362/61; 362/297; 362/346
[58] Field of Search ............ 362/61, 297, 298, 362/300, 307, 346

[56] References Cited

U.S. PATENT DOCUMENTS

| | | | |
|---|---|---|---|
| 5,113,320 | 5/1992 | Haydu | 362/61 |
| 5,169,224 | 12/1992 | Segoshi et al. | 362/61 |
| 5,180,218 | 1/1993 | Ohshio | 362/61 |
| 5,285,358 | 2/1994 | Watanabe et al. | 362/61 |

FOREIGN PATENT DOCUMENTS 3415442  10/1984  Germany.

*Primary Examiner*—Denise L. Gromada
*Assistant Examiner*—Alfred Basichas
*Attorney, Agent, or Firm*—Michael J. Striker

[57] ABSTRACT

The headlamp having a housing in which a reflector is arranged adjustably and the light exit opening of which is covered by a covering plate. In the region of the light exit opening of the housing there is arranged a covering device which has a fastening portion held in the housing and an edge portion which projects from said fastening portion counter to the light exit direction. Formed between the edge portion and the fastening portion is a clearance into which the front edge of the reflector projects, a distance which is required for the adjustment of said reflector being maintained from these parts. From outside the housing, when looking through the covering plate, no gap is visible between the front edge of the reflector and the inside of the housing.

10 Claims, 3 Drawing Sheets

5,521,798

HEADLAMP FOR VEHICLES WITH REFLECTOR EDGE COVER

BACKGROUND OF THE INVENTION

The present invention relates to a headlamp for vehicles.

A headlamp disclosed by DE 34 15 442 A1 has a housing in which a reflector is arranged adjustably and the light exit opening of which is covered by a covering plate. Arranged in the housing, in the region of the light exit opening thereof, is a covering device which has an edge portion which extends counter to the light exit direction to the front edge of the reflector and runs at a distance from the housing surrounding said reflector. By means of this edge region a gap present between the front edge of the reflector and the inside of the housing, which inside appears dark, is concealed over the entire circumference. This gap is required in order to allow an adjustment of the reflector. The edge portion of the covering device is in approximate alignment with the front edge of the reflector and extends into close proximity with the latter, although it is still necessary, here for a gap to be present in order to allow the adjustment of the reflector, through which gap the dark inside of the housing is still visible. In this arrangement, the edge portion of the covering device is visible from outside the housing through the covering plate and so as to obtain a favorable appearance of the headlamp has to be designed such that it is reflective, like the reflector. All in all, the covering device of this known headlamp does not completely conceal the gap between the front edge of the reflector and the inside of the housing so that the gap can still be seen and, in addition, this covering device requires a high outlay on production.

SUMMARY OF THE INVENTION

Accordingly, it is an object of the present invention to provide a headlamp for vehicles, which avoids the disadvantages of the prior art.

In keeping with these objects and with others which will become apparent hereinafter, one feature of the present invention resides, briefly stated, in a headlamp for vehicles with a housing, a reflector arranged adjustably in the housing, a transparent covering plate for covering an exit opening of the housing and the covering device arranged in the housing in the region of the light exit opening to conceal a gap between a front edge of the reflector and inside of the housing at least over a part of the circumference of the reflector with an edge portion extending counter to the light exit direction to the front edge of the reflector, wherein the front edge projects into the clearance between the edge portion of the covering and a component surrounding the edge portion, a distance which is sufficient for an adjustment of the reflector being maintained from the edge portion and from the component.

When the headlamp is designed in accordance with the present invention, it has, in contrast, the advantage that the gap between the front edge of the reflector and the inside of the housing is completely concealed. The gap between the edge portion of the covering device and the front edge of the reflector does not cause a problem in this arrangement since it is the reflector rather than the inside of the housing which is visible through this gap, which reflector is reflective and therefore does not appear dark.

In accordance with another feature of the present invention, the edge portion of the covering device is transparent. It is achieved by this design that through the edge portion of the covering device the reflectively designed front edge of the reflector, is visible and, as a result, the covering device is not obtrusive without the covering device itself having to be designed in a complex manner so that it is reflective.

In accordance with still another feature of the present invention, the edge portion of the covering device has scattering profiling. It is achieved by this device that the border of the front edge of the reflector is not clearly visible. A simple embodiment of the covering device without the latter requiring an additional component is achieved by the covering device consisting only of the edge portion, which is formed in one piece with the covering plate.

In accordance with still another feature of the present invention, the front edge of the reflector runs closer to the inside of the housing than the edge portion of the reflector, which edge portion adjoins the front edge counter to the light exit direction. It is achieved by these features that the edge portion of the covering device does not protrude intrusively into the reflector.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
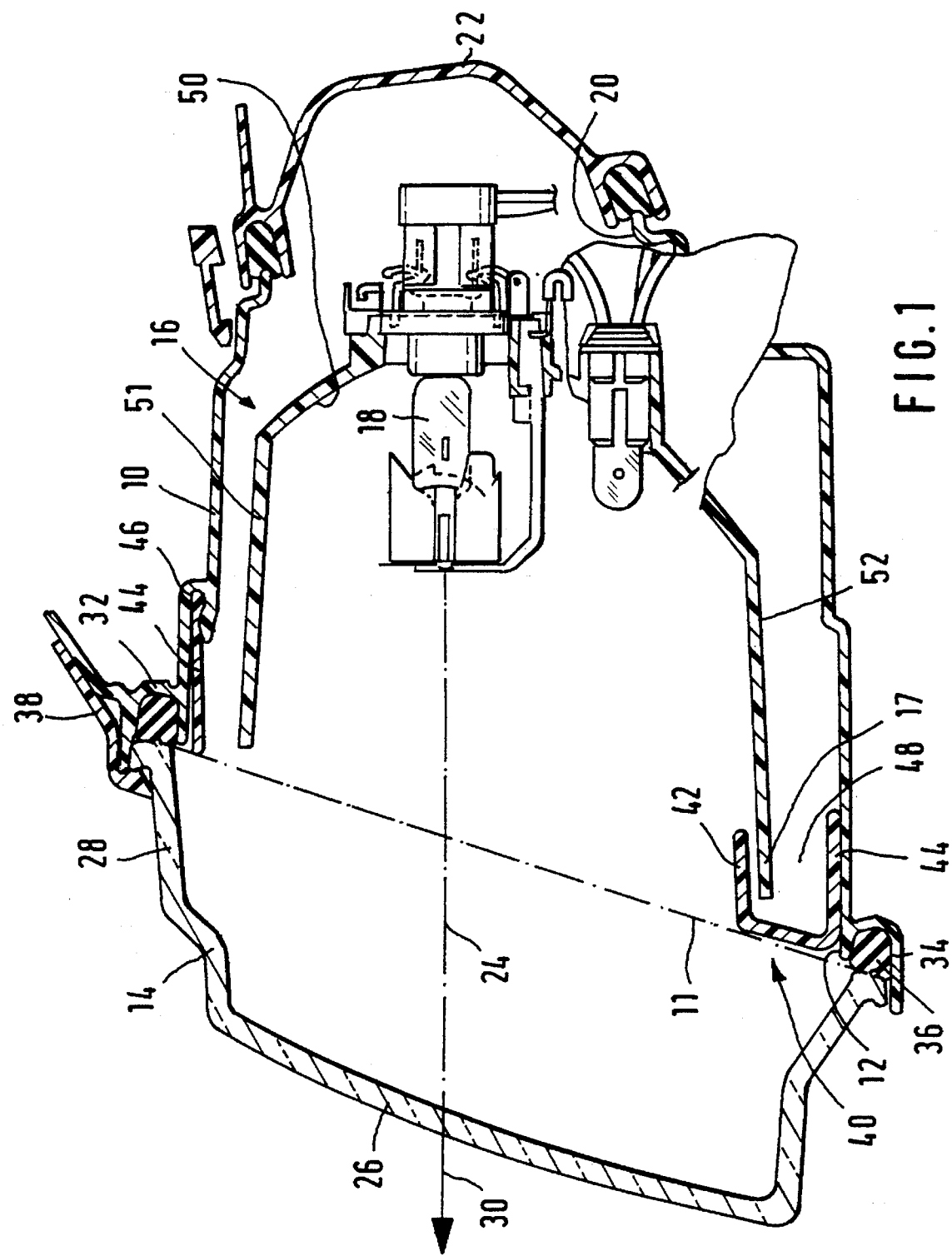
FIG. 1 shows a headlamp for vehicles in a vertical axial longitudinal section with a covering device according to a first exemplary embodiment.

A headlamp which is illustrated in FIG. 1 and is intended for vehicles, in particular motor vehicles, has a housing 10 which is preferably made of plastic. At one end, the front end, the housing 10 has a light exit opening 12 which is covered by a transparent covering plate 14. Arranged adjustably in the housing 10 is a reflector 16, in the apex region of which there is inserted a light source 18. The reflector 16 can be pivoted in the housing 10 in a known manner, which is not shown in more detail, about a horizontal axis and/or about a vertical axis for the purpose of adjusting the direction of the light beam reflected by said reflector. At its rear side, the housing 10 has an opening 20 through which the light source 18 is accessible for exchange and which can be closed by means of a cap 22.

The covering plate 14 has a main region 26 which extends transversely to the optical axis 24 of the headlamp and through which the light beam reflected by the reflector 16 passes and which can be provided with optically acting elements by means of which the light passing through is affected, i.e. is deflected. The main region 26 may be arranged perpendicularly to the optical axis 24 or inclined relative to the latter in the vertical direction and/or in the horizontal direction. The main region 26 may furthermore be of planar or curved design. A peripheral edge 28 projects from the main region 26, on the outer circumference thereof, counter to the light exit direction 30 to the front edge 11 of the housing 10. Formed on the front edge 11 of the housing 10, in a manner such that it surrounds the light exit opening 12 thereof, is a flange 32 having a groove 34 which is open in the light exit direction 30. The end of the edge 28 of the covering plate 14 projects into the groove 34, it being possible also to arrange in the groove 34 an elastically deformable sealing element 36 against which the edge 28 comes to rest. The covering plate 14 is held on the housing 10 by means of a plurality of clips 38 distributed over its circumference. Alternatively, the covering plate 14 may also be bonded adhesively in the groove 34.

In the housing 10 there is furthermore arranged, in the region of the light exit opening 12 of the housing 10, a covering device 40 which is illustrated in FIG. 1 according to a first exemplary embodiment. The covering device 40 has an edge portion 42 which extends counter to the light exit direction 30 to the front edge 17 of the reflector 16 and a fastening portion 44 which is formed in one piece with the edge portion 42. The fastening portion 44 surrounds the entire circumference of the front edge 17 of the reflector 16 and is fastened to the inside of the housing 10. For this purpose, the housing 10 has a plurality of pockets 46 which are distributed over the circumference of the fastening portion 44, are open in the light exit direction 30 and in which the fastening portion 44 engages. Provision may also be made for the fastening portion 44 only to surround a portion of the circumference of the front edge 17 of the reflector 16. The edge portion 42 and the fastening portion 44 are connected to each other at that end of the covering device 40 which extends as far as the front edge 11 of the housing 10 so that the inside of the housing 10 is concealed by them. The edge portion 42 runs at a distance from the fastening portion 44 and a clearance 48 which is open counter to the light exit direction 30 is thus formed between them. The covering device 40 is preferably made of plastic and may have a reflective coating on its surfaces which are visible from outside the housing 10. The edge portion 42 is formed only in the lower circumferential region and in the lateral circumferential regions of the housing 10 but may also be formed in other circumferential regions or over the entire circumference of the housing 10.

The reflector 4 has a concavely curved main region 50 by means of which the light emitted from the light source 18 is reflected to form the light beam. Adjoining the main region 50 are an upper wall 51 and a lower wall 52 which extend approximately in the light exit direction 30 as far as the front edge 17. Viewed in horizontal, axial longitudinal section through the headlamp, the main region 50 of the reflector 16 extends as far as the front edge 17 thereof. The front edge 17 of the reflector 16 projects into the clearance 48 of the covering device 40 and extends approximately parallel to the edge portion 42. Between the front edge 17 of the reflector 16 and the edge portion 42 as well as the fastening portion 44 there remains a sufficient distance to allow an adjustment of the reflector 17.

By means of the above-described covering device 40, the gap between the front edge 17 of the reflector 16 and the inside of the housing 10 is concealed so that said gap, when viewed from outside the housing 10 through the covering plate 14, is not visible. A gap present between the edge portion 42 and the front edge 17 of the reflector 16 is open counter to the light exit direction 30 and is therefore not visible through the covering plate 14. Since, in its installation position on the vehicle, the headlamp is for the most part viewed obliquely from above, it is sufficient for the portion 42 only to be present in the lower and lateral circumferential region of the housing 10.

Figure 2:
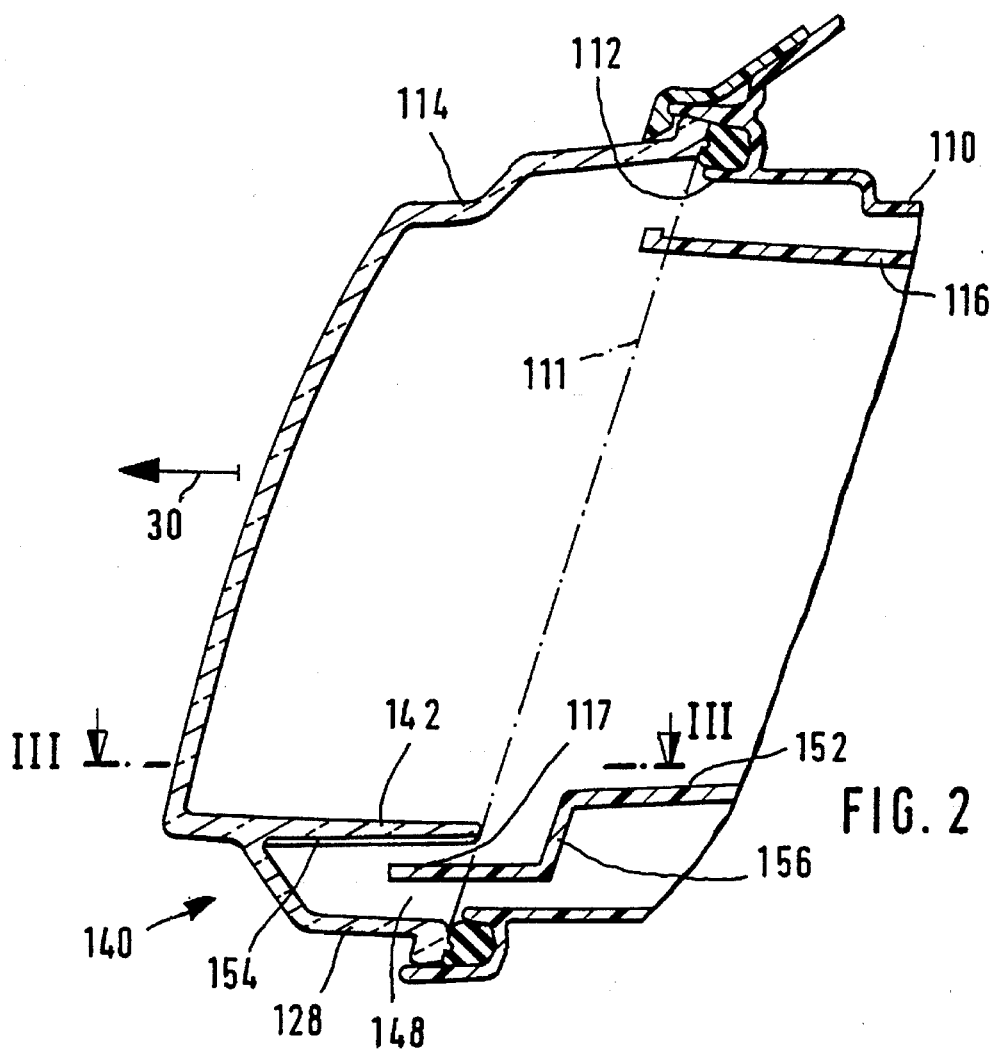
FIG. 2 shows a detail of the headlamp with the covering device according to a second exemplary embodiment.

FIG. 2 illustrates a detail of the headlamp with the covering device 140 according to a second exemplary embodiment. In this arrangement, the covering device 140 is arranged in the region of the light exit opening 112 of the housing 110 and consists only of the edge portion 142, which is formed in one piece with the covering plate 114, which is made of plastic, the edge portion 142 being arranged within the peripheral edge 128 and extending approximately parallel to and at a distance from the latter so that the clearance 148 is formed between the edge portion 142 and the edge 128. The edge portion 142 extends counter to the light exit direction 30 approximately to the same extent as the edge 128 of the covering plate 114. In this case, the edge portion 142 is formed only in a circumferential region of the covering plate 114 which is at the bottom in the installation position of the headlamp, but may also be arranged in any other circumferential region of the covering plate 114 or may extend over the entire circumference of the covering plate 114. Like the covering plate, the edge portion 142 is of transparent design and has scattering profiling 154 at least on one side, i.e. on its side which faces the edge 128 of the covering plate 114, or on its side which is remote from the latter.

The front edge 117 of the reflector 116 protrudes in its lower circumferential region in the light exit direction 30 beyond the front edge 111 of the housing 110 and projects by its lower circumferential region into the clearance 148 present between the edge portion 142 of the covering device 140 and the edge 128 of the covering plate 114. The front edge 117 of the reflector 116 projecting into the clearance 148 extends approximately parallel to the edge portion 142 and to the edge 128 but there remains between this front edge and the edge portion 142 as well as the edge 128 a sufficient distance to allow an adjustment of the reflector 116. The reflector 116 has a reflective coating on its inside as far as its front edge 117 so that that part of the reflector 116 which is arranged in the clearance 148 and is visible through the transparent edge portion 142 is also reflective. At least the circumferential region of the front edge 117 of the reflector 116, which front edge projects into the clearance 148, runs closer to the inside of the housing 110 than the lower wall 152 of the reflector 116 but approximately parallel to the latter. At the transition of the reflector 116, from its front edge 117 to the adjoining edge region, which is formed by the wall 152, a step 156, which is directed towards the inside of the housing 110, is present, a sufficient distance remaining between the end of the edge portion 142 and the step 156 to allow an adjustment of the reflector 116. As a result, the edge portion 142 does not protrude into the beam path of the light beam reflected by the main region of the reflector 116 but is arranged closer to the edge 128 of the covering plate 114 than the wall 152 of the reflector 116. The edge portion 142 may also be arranged in such a manner that it is approximately in alignment with the wall 152 of the reflector 116.

Figure 3:
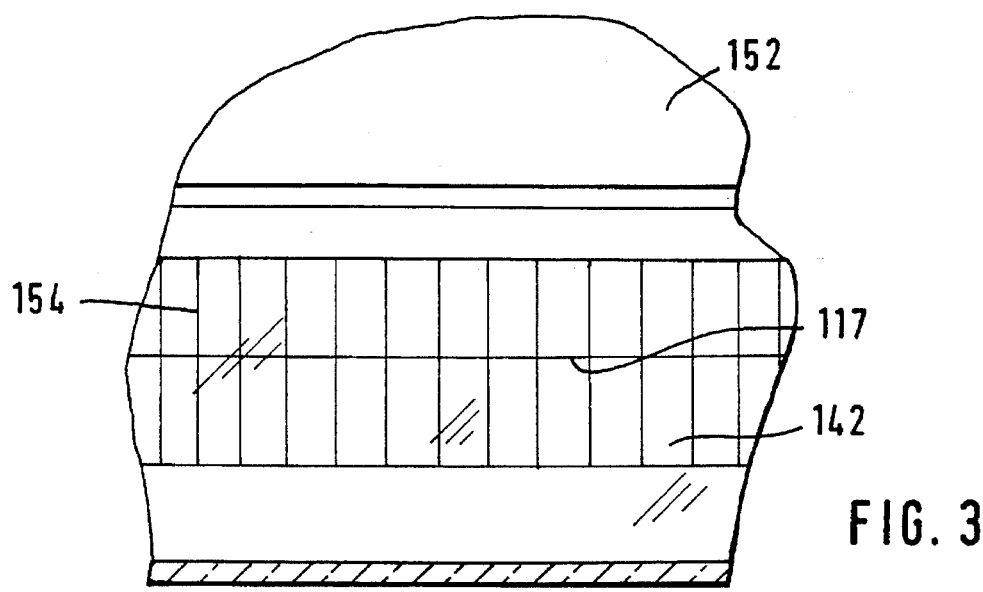
FIG. 3 shows the headlamp in a section along the line III—III in FIG. 2.

It is achieved by means of the scattering profiling 154 of the edge portion 142 that in the clearance 148 the contours of the front edge 117 of the reflector 116 as well as of the front edge of the housing 110 are less well defined and cannot be seen clearly when looking from outside the housing 110, as is illustrated in FIG. 3. The scattering profiling 154 may be of any desired design, for example as is illustrated in FIG. 3, as cylindrical lenses which extend approximately along the light exit direction 30, or as fluting or as small elevations or depressions in the surface of the edge portion 142. By means of the covering device 140 the gap which is present between the front edge 117 of the reflector 116 and the inside of the housing 110 is overall concealed so that it cannot be seen when viewing from outside the housing 110 through the covering plate 114, the covering device 140 scarcely being discernible due to its transparent design and the front edge 117 of the reflector 116 which is visible through it.

Figure 4:
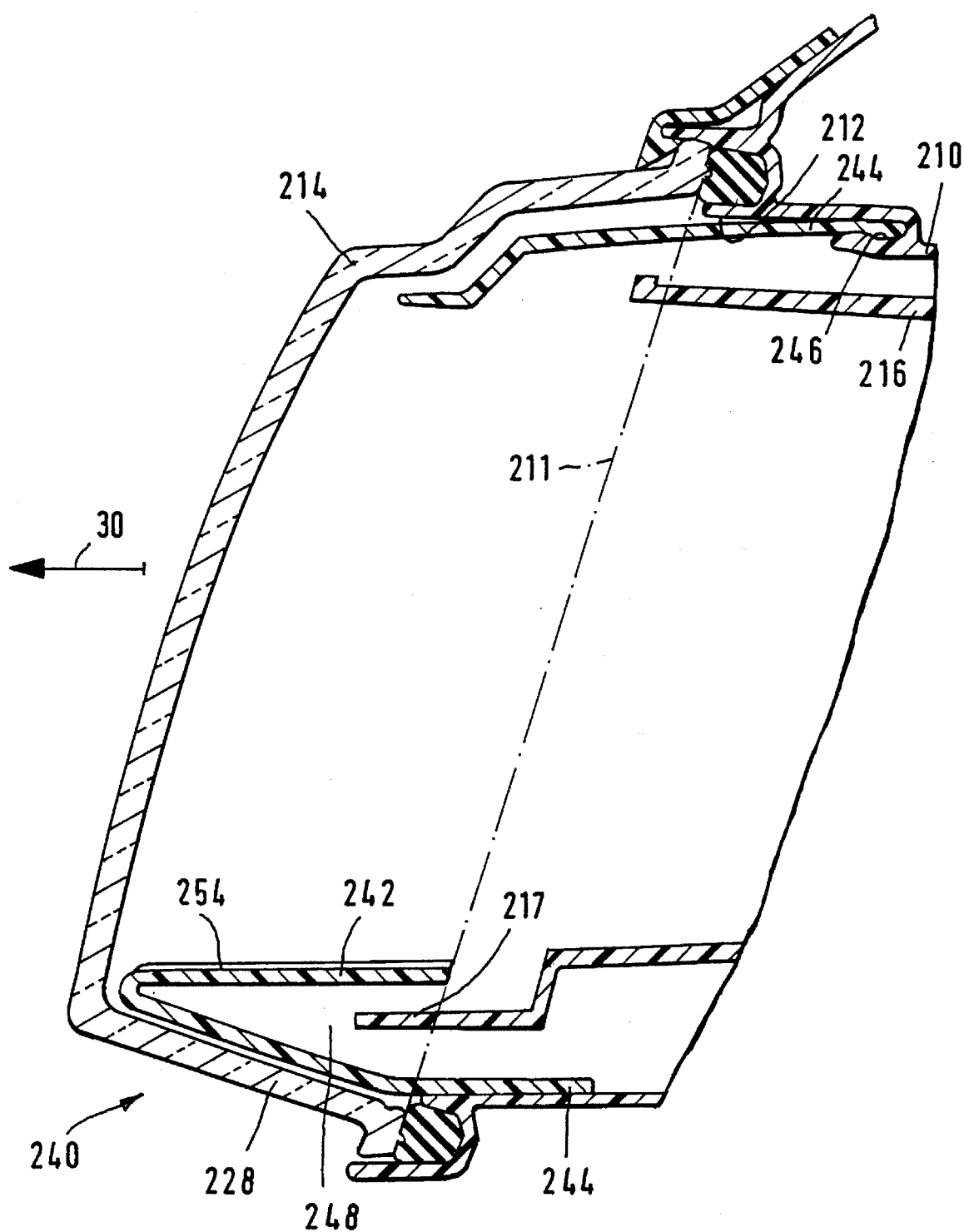
FIG. 4 shows a detail of the headlamp with the covering device according to a third exemplary embodiment.

FIG. 4 shows only part of the headlamp with a third exemplary embodiment of the covering device 240. The reflector 216 is of identical design to that described in the second exemplary embodiment. The covering device 240 is arranged in the region of the light exit opening 212 of the housing 210 and is configured as a separate part which is made of transparent plastic. The covering device 240 has the edge portion 242 which extends counter to the light exit direction 30 to the front edge 217 of the reflector 216 and also an annular fastening portion 244 which surrounds the entire circumference of the front edge 218 of the reflector 216. The fastening portion 244 projects into the housing 210 and at a plurality of points distributed over its circumference engages in pockets 246 formed in the housing 210, the covering device 240 thereby being fastened in the housing 210. Provision may also be made for the fastening portion 244 to extend over only part of the circumference of the reflector 216. In addition, the fastening portion 244 projects in the light exit direction 30 beyond the front edge 211 of the housing 210 within the edge 228 into the covering plate 214 and there runs approximately parallel to the edge 228. The edge portion 242 runs approximately parallel to the front edge 217 of the reflector 217 and extends in the lower circumferential region of the front edge 217 of the reflector 216. It is, however, also possible to provide the edge portion 242 over the entire circumference of the front edge 217 of the reflector 216. Between the edge portion 242 and the fastening portion 244 there remains a clearance 248 into which the front edge 217 of the reflector 216 projects, a distance which is sufficient for adjustment of the reflector being maintained from the edge portion 242 and from the edge 228. In this arrangement, the front edge 217 of the reflector 216 projects in the light exit direction 30 beyond the front edge 211 of the housing 210. At least the edge portion 242 of the covering device 240 has scattering profiling 254. In addition, that part of the fastening portion 244 which is visible through the covering plate 214 may also have scattering profiling. The effect of the covering device 240 according to the third exemplary embodiment is identical to that indicated above for the second exemplary embodiment.

It will be understood that each of the elements described above, or two or more together, may also find a useful application in other types of constructions differing from the types described above.

While the invention has been illustrated and described as embodied in a headlamp for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlamp for vehicles, comprising a housing having a light exit opening; a reflector arranged adjustably in said housing and having a front edge; a transparent covering plate which covers said light exit opening of said housing; and a covering device which is arranged in said housing in a region of said light exit opening so as to at least partially conceal a gap between said front edge of said reflector and an inside of said housing at least over a part of a circumference of said reflector, said covering device having an edge portion which extends counter to a light exit direction to said front edge of said reflector; a component surrounding said edge portion of said covering device, said front edge of said reflector projecting into a clearance formed between said edge portion of said covering device and said component surrounding said edge portion, a distance which is sufficient for an adjustment of said reflector being maintained from said edge portion of said covering device and from said component surrounding said edge portion.

2. A headlamp as defined in claim 1, wherein at least said edge portion of said covering device is transparent.

3. A headlamp as defined in claim 1, wherein at least said edge portion of said covering device has scattering profiling.

4. A headlamp as defined in claim 1, wherein said reflector has an optical axis, said covering plate having a main region extending transversely to said optical axis and also a peripheral region projecting from said main region counter to the light exit direction toward said housing, said edge portion of said covering device being arranged within said peripheral edge of said covering plate.

5. A headlamp as defined in claim 1, wherein said covering device consists only of said edge portion of said covering device, said edge portion being formed of one piece with said covering plate.

6. A headlamp as defined in claim 1, wherein said covering plate is composed of plastic.

7. A headlamp as defined in claim 1, wherein said covering device is composed of plastic.

8. A headlamp as defined in claim 1, wherein said reflector has an edge region adjoining said front region of said reflector counter to the light exit direction, said front edge of said reflector running closer to the inside of said housing than said edge region of said reflector.

9. A headlamp as defined in claim 8, wherein said front edge of said reflector and said edge region of said reflector have a transition therebetween, said transition being formed as a step which is directed toward the inside of said housing.

10. A headlamp as defined in claim 8, wherein said edge portion of said covering device is substantially in alignment with said edge region of said reflector.

* * * * *